Nov. 14, 1944.                D. BELCHER ET AL                2,362,462
                               BAG CLOSING MACHINE
                            Filed April 8, 1940            9 Sheets-Sheet 1

INVENTORS
DANIEL BELCHER
FRANK R. LINDA
By Paul, Paul & Moore
ATTORNEYS

Nov. 14, 1944.  D. BELCHER ET AL  2,362,462
BAG CLOSING MACHINE
Filed April 8, 1940  9 Sheets-Sheet 2

INVENTORS
DANIEL BELCHER
FRANK R. LINDA
By Paul, Paul & Moore
ATTORNEYS

INVENTORS
DANIEL BELCHER
FRANK R. LINDA
ATTORNEYS

Nov. 14, 1944.   D. BELCHER ET AL   2,362,462
BAG CLOSING MACHINE
Filed April 8, 1940   9 Sheets-Sheet 5

INVENTORS
DANIEL BELCHER
FRANK R. LINDA
By Paul, Paul Moore
ATTORNEYS

Nov. 14, 1944.  D. BELCHER ET AL  2,362,462
BAG CLOSING MACHINE
Filed April 8, 1940 9 Sheets-Sheet 6

INVENTORS
DANIEL BELCHER
FRANK R. LINDA
By Paul, Paul Moore
ATTORNEYS

Nov. 14, 1944.     D. BELCHER ET AL     2,362,462
BAG CLOSING MACHINE
Filed April 8, 1940     9 Sheets-Sheet 7

INVENTORS
DANIEL BELCHER
FRANK R. LINDA
By Paul, Paul & Moore
ATTORNEYS

Nov. 14, 1944.   D. BELCHER ET AL   2,362,462
BAG CLOSING MACHINE
Filed April 8, 1940   9 Sheets-Sheet 8

INVENTORS
DANIEL BELCHER
FRANK R. LINDA
By Paul, Paul & Moore
ATTORNEYS

Nov. 14, 1944.　　　D. BELCHER ET AL　　　2,362,462
BAG CLOSING MACHINE
Filed April 8, 1940　　　9 Sheets-Sheet 9

INVENTORS
DANIEL BELCHER
FRANK R. LINDA

By Paul, Paul & Moore
ATTORNEYS

Patented Nov. 14, 1944

2,362,462

UNITED STATES PATENT OFFICE 2,362,462

BAG CLOSING MACHINE

Daniel Belcher, Minneapolis, Minn., and Frank R. Linda, St. Louis, Mo., assignors to Bemis Bro. Bag Co., Minneapolis, Minn., a corporation of Missouri Application April 8, 1940, Serial No. 328,518

9 Claims. (Cl. 226—56)

This invention relates to new and useful improvements in machines for closing and sealing the open tops of flexible containers or bags, and more particularly to a machine adapted to apply and secure a strip of tape over the edges of the bag top walls, after said walls have been pressed into flatwise relation.

It is now common practice to package numerous kinds of comminuted materials such as sugar, in paper bags or containers. When sugar is packaged in such containers, it is of utmost importance that the closed tops of the containers or bags be tightly sealed to prevent sifting of the sugar from the closed bag tops. The tops of small bags, such as 5 pound bags, may readily be closed with perfect safety by folding the bag tops into closing and sealing relation and then bonding them together with a suitable adhesive. In larger bags, such as 10 and 25 pound bags, the bag walls are usually made from slightly heavier stock to withstand handling, and it may therefore be difficult at times, to securely unite or bond together the folded bag top walls of such bags by the use of an adhesive, without danger of the bag tops opening, when the closed bags are roughly handled. In the larger bags, it has been found more desirable to close the top bags by pressing the bag top walls into flatwise relation with the end walls intucked between the side walls, or not, as desired, and then applying a strip of tape over the upper edges of the bag top walls and suitably securing it thereto, preferably by stitching. Bags thus closed may readily be handled in transit without danger of the bag tops opening or becoming leaky to permit the contents from sifting from the bags.

The novel machine herein disclosed comprises a plurality of stations arranged along a main conveyer and at which stations, the various operations of filling the bags, settling the contents therein, and closing and sealing the bag tops, are successively performed, as the bags advance through the machine.

The invention has for an object the provision of a simple and efficient bag holder adapted to hold the bags in position to receive a charge, by simply gripping the upper portion of the bag, and whereby the empty bag is suspended from the bag holder, while receiving its charge.

A further object of the invention resides in the provision of a machine of the class described comprising a trough-shaped main conveyer adapted for continuous operation to convey the bags through the machine in spaced relation, the V-shape of the conveyer conforming substantially to the shape of the bottoms of the filled bags, and serving to prevent the bags from relatively rotating on the conveyer, as they advance through the machine.

A further object is to provide a machine of the class described comprising a main conveyer having side belts arranged adjacent thereto, the inner runs of which are adapted to engage opposite sides of the bag bodies, and said inner runs tapering inwardly from the receiving end of the conveyer and having upper portions thereof inclined inwardly, whereby the bag tops are gradually flattened, as the bags advance through the machine.

A further object resides in the means provided for pressing the partially flattened bag top walls into flatwise relation before applying and securing a strip of tape over the upper edges thereof.

A further object resides in the means provided for controlling the delivery of the filled bags to the sewing head, whereby the application of the strip of tape to the bag top and the sewing of said strip to the bag top may be accurately timed.

Other objects of the invention reside in the unique construction of the means for pressing the walls of the open bag top into flatwise relation prior to applying a strip of tape over the uper edges thereof and stitching it thereto to seal the bag top; in the means for controlling the operation of the sewing head in timed relation to the movement of the bags through the machine; in the means for severing the tape between consecutive bags, after the tape has been sewed to the bag tops, and in the means for controlling the operation of the tape severing mechanisms; in the novel construction of the means for supporting the bags while receiving a charge and whereby each bag, while being filled, is suspended from the bag holder independently of the main conveyer; in the means for successively releasing the filled bags from the bag holder and delivering them to the main conveyer in spaced relation; and, in the general construction and arrangement of the various parts of the machine, whereby the machine is substantially automatic and continuous in operation.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Machine in general

Briefly, the novel machine herein disclosed comprises a main frame including side rails 2 and 3 supported on suitable cross members 4 and channels 5. A plurality of stations, A, B, C, and D, are arranged lengthwise of the machine. At station A, the bags receive a predetermined charge of material and are then delivered onto the main conveyer, generally designated by the numeral 6. The bags then advance to station B, where they are subjected to a vibratory motion to settle the contents thereof. The bags then pass onto station C, where the walls of the partially flattened bag tops are pressed firmly into flatwise relation, after which the bags pass through station D, where a strip of tape is folded over the upper edges of the bag top walls and suitably stitched thereto. The tape is then severed, which completes the operation of closing and sealing the bag tops.

Bag holder—Station A

Figure 1:
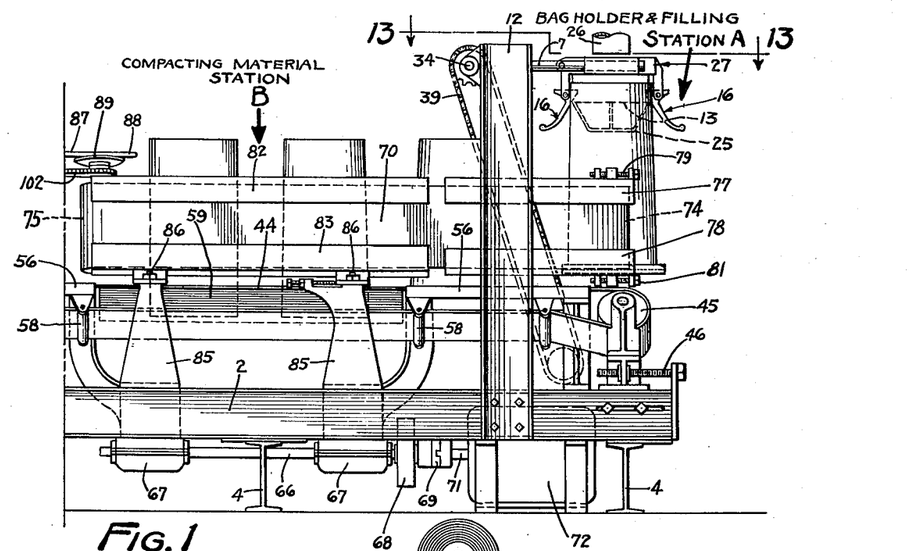
Figure 1 is a side elevation of the receiving end of the machine, showing the means for holding the bags while being filled, and also showing the position of the filled bags on the main conveyer, as they are advanced through the machine.

An important feature of the invention resides in the novel construction of the bag holder provided at station A, and best shown in Figures 1 and 12 to 16, inclusive. The bag holder is shown comprising a pair of spaced supporting rods 7 and 8, each having one end secured to castings 9 and 11, respectively, suitably secured to upright posts 12 having their lower ends suitably secured to the side members 2 and 3 of the main frame, as shown in Figure 1.

Figures 13, 14, 16:
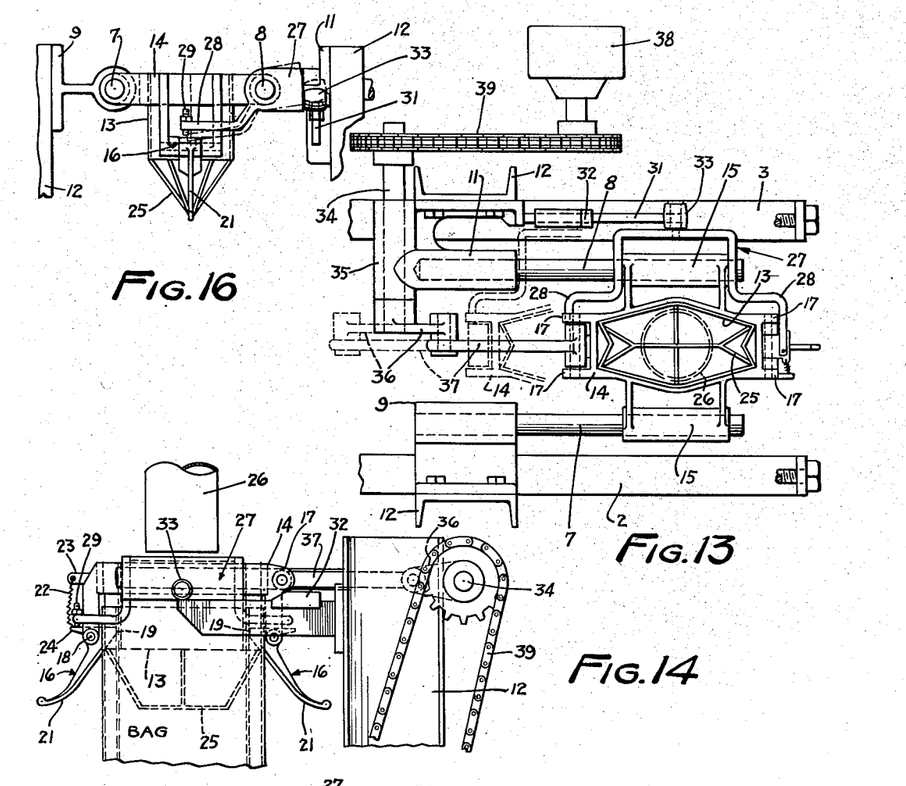
Figure 13 is a plan view on the line 13—13 of Figure 1, showing the means for moving the filled bags from a position beneath the filling spout onto the main conveyer.
Figure 14 is a fragmentary side elevational view of the driving means for the bag holding and releasing mechanism, showing a bag supported on the bag holder.
Figure 16 is a fragmentary end elevation of the bag holder and the bag releasing mechanism.
Figure 15:
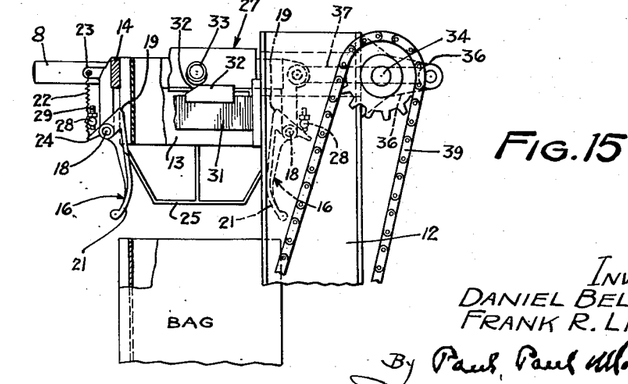
Figure 15 is a similar view showing the parts in bag releasing positions.

The means for receiving and supporting the empty bag in position to receive a charge is shown comprising a hollow member or collar 13, having its upper end portion fitted into and secured to an annular frame 14 having oppositely disposed tubular guides 15 adapted to receive the supporting rods 7 and 8, as best shown in Figure 13. The collar or member 13 extends below the annular frame 14 in the form of a skirt, and over this depending skirt portion, the bag mouths are adapted to be fitted, as shown in Figures 14 and 15.

Figure 2:
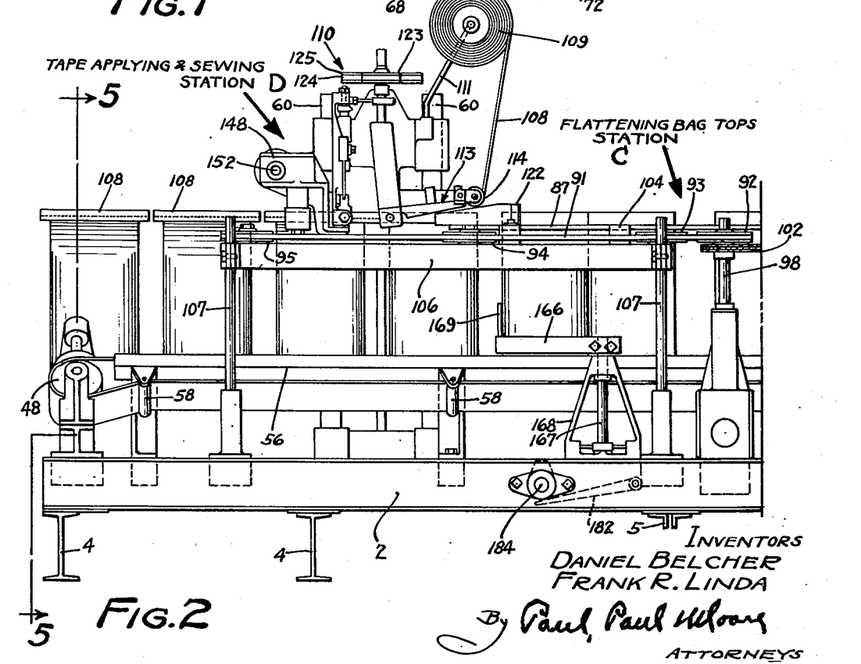
Figure 2 is a side elevation of the discharge end of the machine showing the means for closing the tops of the filled bags and securing a strip of tape to each bag top.

In the operation of closing the bag top walls, as herein disclosed, the end walls of the bag body are preferably intucked between the side walls of the bag top and the skirt 13 is therefore preferably shaped, as best shown in Figure 2. In this figure, it will be noted that the end walls thereof are substantially V-shaped in cross-section, or extend inwardly to facilitate folding the end walls of the bag top inwardly between the side walls thereof, as will readily be understood.

Suitable bag top gripping elements in the form of small levers 16, are pivotally mounted between spaced lugs 17 provided at each end of the supporting frame 14 of the collar or skirt 13. These grippers are pivoted on pins 18 supported in the lugs 17 and have gripping faces 19 adapted to cooperate with the end walls of the skirt 13 to grip the end walls of the bag mouth therebetween, and thereby secure the bag to the skirt in position to receive a charge. The lower end portions 21 of the grippers 16 are preferably outwardly curved, as shown in Figure 14, and are adapted to move inwardly and engage the end walls of the bag, as the bag is released from the skirt 13 by actuation of the grippers 16. Suitable springs 22 are shown connected between fixed lugs 23 and the outwardly extending portions 24 of the grippers 16, and constantly urge the grippers into bag engaging position, as shown in Figure 14. In Figure 15, the grippers are shown in their inoperative positions, as when releasing a bag from the bag holder. A suitable open guide 25 is preferably secured to the lower edge of the skirt 13 to guide the open end or mouth of the bag over the skirt, as will readily be understood by reference to Figures 14 and 15.

Figure 12:
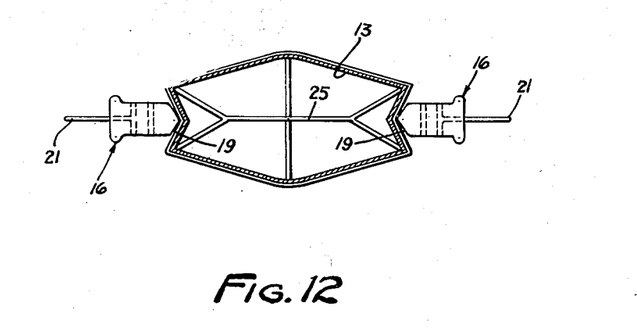
Figure 12 is an enlarged detail sectional view substantially on the line 12—12 of Figure 16, showing the general shape of the bag holding collar or member of the bag holder, and the means for guiding the bag mouth walls onto the collar.

The upper portions of the grippers 16 are preferably shaped as shown in Figure 12, wherein it will be noted that the gripping surfaces 19 thereof are substantially V-shaped to correspond more or less to the V-shape of the end walls of the skirt 13. In Figure 12, the walls of the bag top are shown fitted over the skirt 13 and the end walls thereof gripped by the grippers 16.

Means is provided for actuating the grippers 16 to positively release the bag therefrom, after the bag has received a predetermined charge or load from the filling apparatus, generally indicated by the numeral 26. The specific construction of the filling apparatus forms no part of the present invention, and it is therefore merely indicated in Figures 1 and 14. The means provided for actuating the grippers to cause them to release the bag, is shown comprising a yoke, generally indicated by the numeral 27 and having spaced arms 28, each carrying an adjusting screw 29 adapted to engage one of the grippers 16, as shown in Figures 14 and 15. The yoke is pivoted on the supporting rod 8, as best shown in Figure 13, and when oscillated thereon, the adjusting screws 29 thereof will engage the outward extensions 24 of the grippers, and depress them from the position shown in Figure 14 to that shown in Figure 15, whereby the grippers will release the bag, as shown in Figure 15. When the grippers 16 are actuated to release the bag, they are moved downwardly by the yoke 27, to substantially the position shown in Figure 15, whereby they will engage and retain the end walls of the bag top in their intucked positions between the side walls of the bag top, substantially until the bag is delivered onto the main conveyer 6.

The means provided for oscillating the yoke 17 is shown comprising a stationary cam bar 31, having a cam face 32 adapted to be engaged by a roller 33 carried by the yoke 27, as shown in Figure 13. The cam bar 31 is shown supported on a part of the casting 11 in which the supporting rod 8 is mounted. A crank shaft 34 is shown mounted in a bearing 35 provided in the casting 11, and has a crank arm 36 to which one end of a connecting rod 37 is connected. The opposite end of the connecting rod 37 is pivotally connected to the frame 14 which supports the skirt 13, as shown in Figure 13.

The crank shaft 34 may be driven from a suitable gear reducer 38 by a chain drive 39, as best shown in Figure 13. The speed reducer 38 is driven from a drive shaft 41 which, in turn, is driven from a suitable motor 42 by a suitable belt, generally designated by the numeral 43.

The bag holder herein disclosed is extremely simple and effective in operation. The gripping faces 19 of the grippers 16 are so disposed with respect to the axes of the pivot pins 18 and the end walls of the skirt 13, that when the walls of an open bag top are fitted over the skirt 13 and the grippers 16 are moved into operative positions therewith, as shown in Figure 14, the bag top is firmly secured to the skirt 13, whereby it cannot accidentally become detached therefrom. It will be noted by reference to Figure 1, that the bag is supported entirely by the grippers during the filling operation of the bag, the lower portion or bottom of the bag being spaced from the main conveyer belt 6, as clearly illustrated in Figure 1. The crank shaft 34 operates in timed relation to the other mechanisms of the machine and horizontally moves the bag holder on the supporting rods 7 and 8, from the loading position, shown in Figures 1 and 13, to the dotted line position shown in Figure 13, in which position the yoke 27 is actuated to release the grippers 16. The bag then drops by gravity onto the V-shaped conveyer belt 6, as hereinbefore stated.

*Main conveyer belt*

Figure 3:
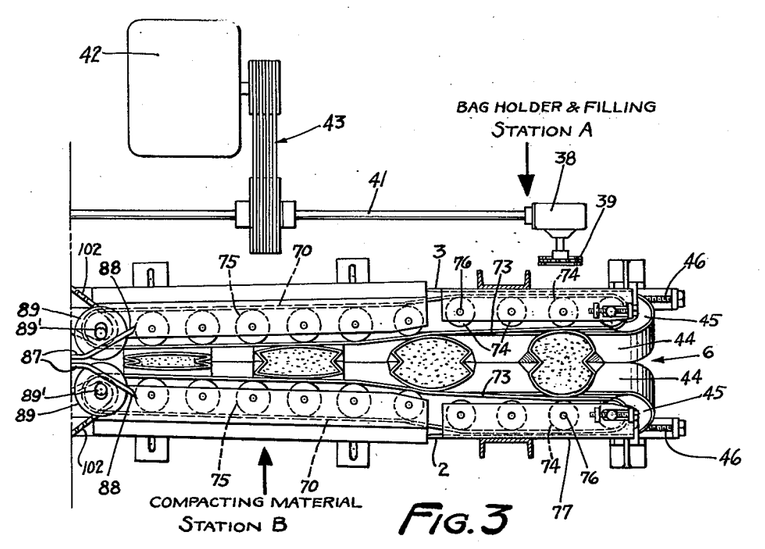
Figure 3 is a top view of Figure 1, with the bag holding means omitted.
Figure 4:
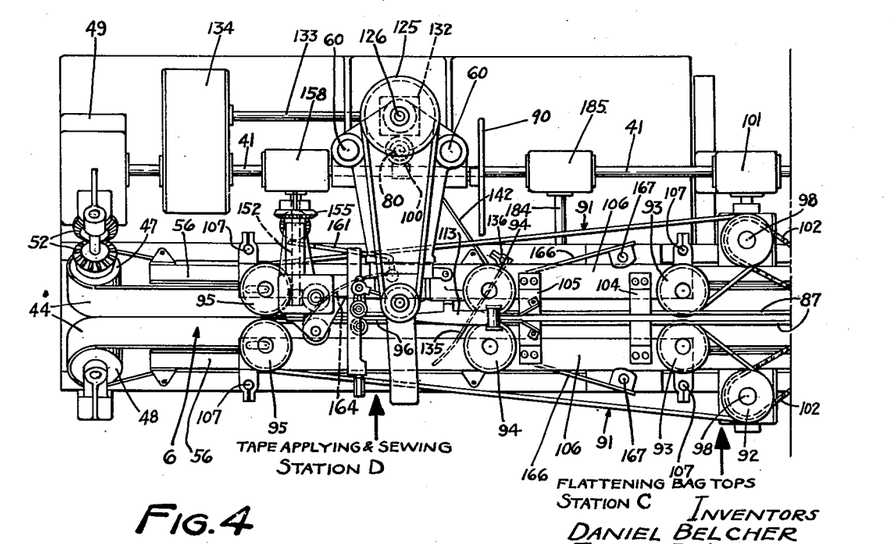
Figure 4 is a plan view of Figure 2.
Figure 5:
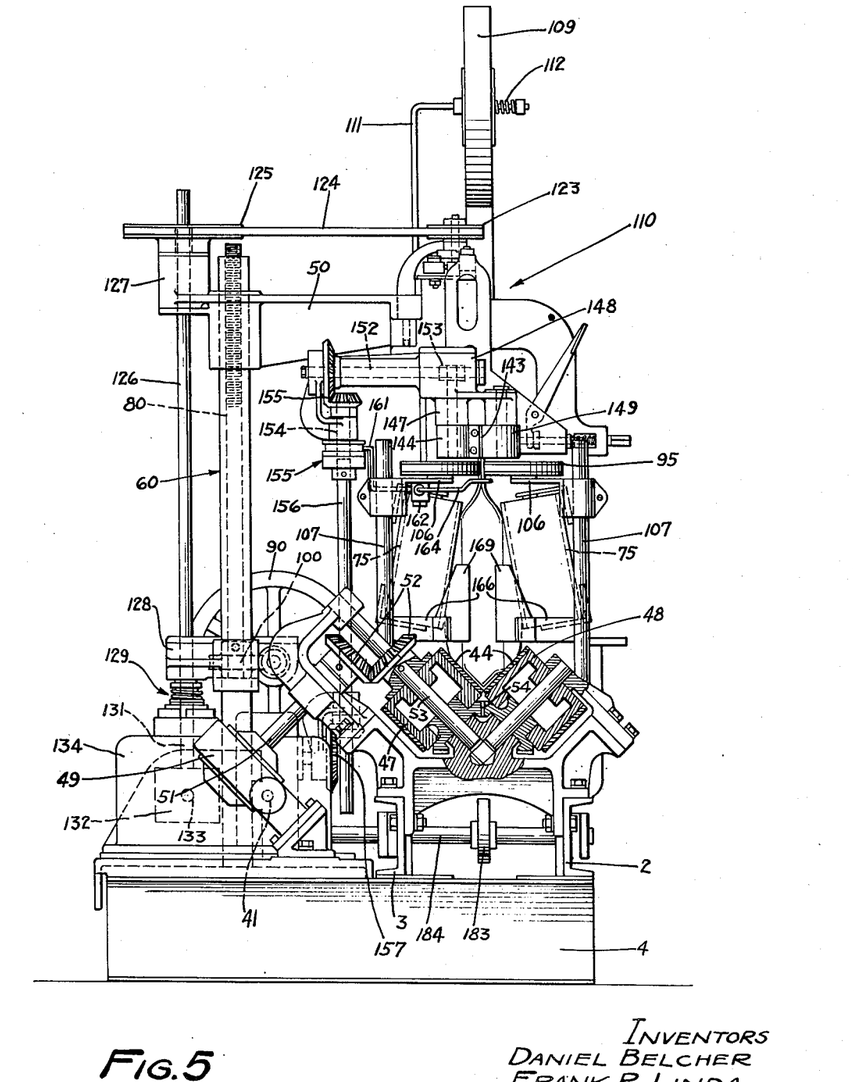
Figure 5 is a cross-sectional view substantially on the line 5—5 of Figure 2, showing the means for driving the V-shaped conveyer.
Figures 6, 7:
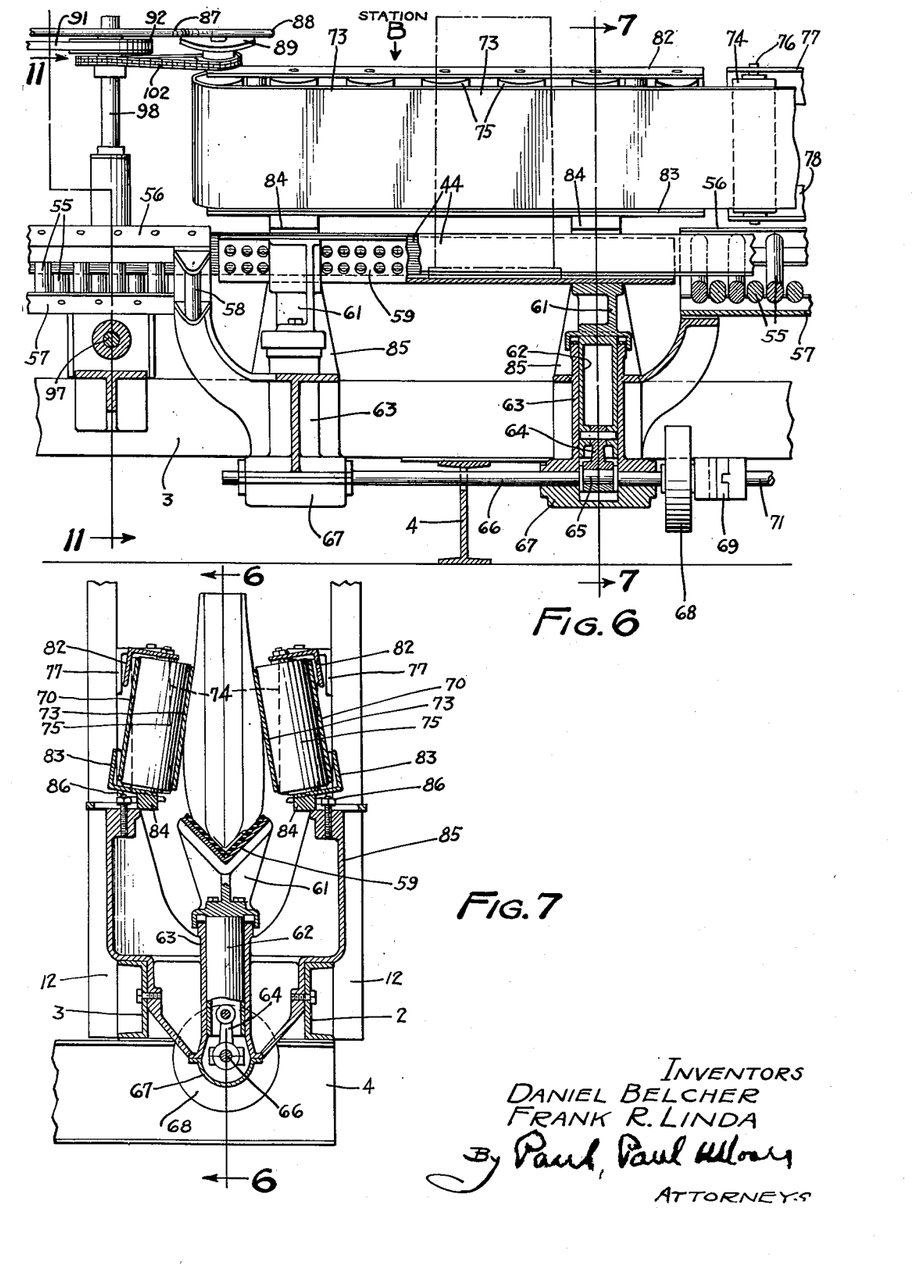
Figure 6 is a sectional elevation substantially on the line 6—6 of Figure 7, showing the shaker mechanism.
Figure 7 is a cross-sectional view on the line 7—7 of Figure 6.
Figure 11:
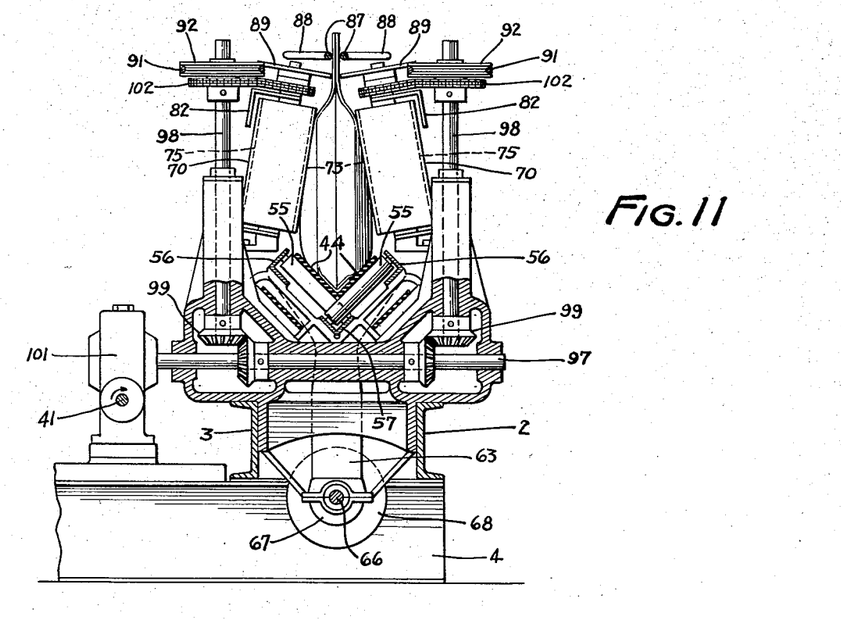
Figure 11 is a cross-sectional view on the line 11—11 of Figure 6, showing a bag positioned on the V-conveyer and the means for compressing the bag bodies as the bags advance to the tape applying and sewing mechanisms.

The main conveyer belt 6, as best shown in Figures 3 and 4, comprises two endless flat belts 44, supported at the receiving end of the machine by suitable pulleys or rollers 45, mounted for relative adjustment on the main frame of the machine by suitable adjusting screws 46, and whereby the belts may be kept taut. Similar pulleys or rollers 47 and 48 are provided at the opposite end of the machine for supporting the belts 44. The adjacent runs of the belts 44 are disposed substantially in right angular relation, as shown in Figures 5, 7, and 11, whereby they cooperate to provide a trough-like conveyer which substantially corresponds to the shape of the bag bottoms, as shown in Figure 7. The belts 44 which constitute the main conveyer belt 6 are shown driven from a speed reducer 49 through a shaft 51, bevel gears 52, and a shaft 53, upon which the roller or pulley 47 is secured. Bevel gears 54 provide a drive connection between the pulleys 47 and 48, as shown in Figure 5, whereby the two belts 44 are simultaneously driven at the same speed, when the machine is in operation. The speed reducer 49 is driven from the main drive shaft 41, as shown in Figure 4.

The inner or adjacent runs of the belts 44 are supported on a plurality of closely spaced rollers 55, rotatively supported in suitable rails 56 and 57, as shown in Figure 11. The outer runs of the belts 44 are supported on spaced rollers 58, as shown in Figures 1 and 2.

*Compacting mechanism—Station B*

The means for compacting the material in the bags is best shown in Figures 6 and 7, and comprises a trough-shaped member 59 secured to the upper ends of a pair of supporting members 61 having tubular portions 62 received in guides 63 secured to the machine frame. The tubular portions 62 have their lower ends connected to a pair of pitmans 64 which are engaged with suitable eccentrics 65 provided on a shaft 66, shown supported in suitable bearings provided in the housings 67 of the guides 63. The shaft 66 is shown provided with a suitable fly-wheel 68, and a clutch 69 provides means whereby it may be operatively connected to a drive shaft 71 which, in turn, is driven from an independent motor 72, indicated in Figure 1. Suitable means, not shown, is provided for manipulating the clutch 71. When the shaft 66 is rotated, the supporting member 61 of the trough-shaped member 59 is rapidly moved in an up-and-down direction, thereby imparting a similar motion to the runs of the belts 44, supported on the member 59. The vibratory motion thus imparted to the belt runs at station B will impart a vibratory motion to the bags as they pass over station B, thereby firmly compacting or settling the contents in the bags.

Bag body shaping means

The bag body shaping means operates in conjunction with the main conveyer 6 and comprises a pair of oppositely disposed side belts 70, having inner runs 73 adapted to engage the opposite sides of the bag bodies, as clearly illustrated in Figures 3, 7, and 11. Each belt 70 is supported on two groups of rollers, generally designated by the numerals 74 and 75. The rollers 74 are supported on upright pivots or shafts 76 supported in spaced frame members 77 and 78, best shown in Figure 1. The rollers 74 at the receiving end of the machine, are shown adjustably supported in the frame members 77 and 78 by suitable adjusting means, generally indicated by the numerals 79 and 81, whereby the belts 70 may readily and conveniently be maintained at the proper tension.

The rollers 75 are disposed at an angle whereby their upper portions incline inwardly, as best shown in Figures 7 and 11. These rollers are supported on spaced frame members 82 and 83, suitably secured to brackets 84 adjustably mounted on the upper portions of upright brackets 85, as shown in Figures 1 and 7. The brackets 84 are secured to the upper ends of the brackets 85 by suitable adjusting screws 86, whereby the inner runs 73 of the belts 70 may be adjusted towards or away from each other to accommodate various sizes of bags.

By referring to Figure 3, it will be noted that the upper portions of the groups of rollers 74 are spaced relatively wider apart than the upper portions of the rollers 75, this resulting because of the inclined positions of the rollers 75. For convenience, the lower ends of the rollers 75 may be substantially alined with the lower ends of the rollers 74. Because of the upper ends of the rollers 75 being inclined inwardly, as shown in Figure 7, it will be noted that the belt runs 73 engage the bag bodies with gradually increasing pressure as the bags are advanced by the conveyer 6. The bag top is thus gradually flattened as the bags advance through the machine, so that when the bags approach the end rollers of the group of rollers 75, the bag top walls will be pressed into relatively flatwise relation as substantially shown in Figure 3. Because of the belts 70 passing around the groups of rollers 74 and 75, a partial twist is imparted to the inner runs 73 of the belts between the receiving and discharge ends of the belts 70, whereby the upper portions of the bag bodies are subjected to gradually increasing pressure to thereby shape the bag bodies, as will be clearly understood by reference to Figure 7.

Bag top compressing and guiding means— Station C

Another feature of the invention resides in the means provided for further compressing the bag top walls into flatwise relation and directing the compressed walls to the tape applying and sewing mechanisms, subsequently to be described.

Figure 22:
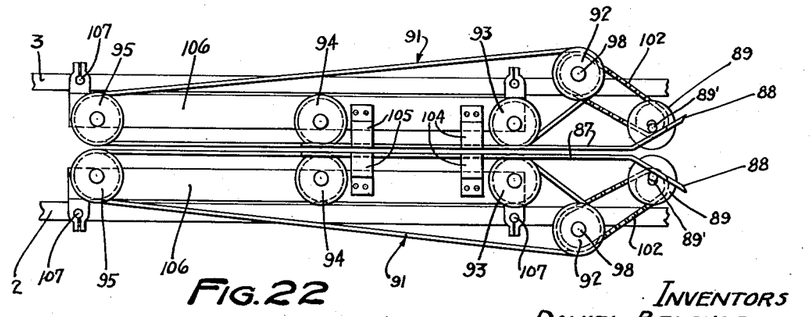
Figure 22 is a plan view showing the guide rods and V-belts for directing the flattened bag top to the tape applying and sewing mechanisms.

As best shown in Figures 4 and 22, the bag top compressing and guiding means comprises a pair of spaced parallel rods 87 having their receiving ends 88 outwardly flared, as shown in Figures 3 and 22. The rods 87 are so spaced apart as to readily receive the flattened bag top as will readily be understood by reference to Figure 4. A pair of disks 89 are secured to the shafts 89' of the end rollers of the groups of rollers 75, and are adapted to engage opposite sides of the bag tops and direct them into the space or throat provided between the rods 87.

A pair of V-belts 91 are shown supported on pulleys 92, 93, 94, and 95, and have their inner runs 96 shown disposed directly below the rods 87, as clearly illustrated in Figure 19. The inner runs 96 of the V-belts 91 are spaced apart a distance substantially equal to the spacing between the rods 87. The travel of the inner runs 96 of the belts 91 is substantially equal to the traveling speed of the main conveyer 6, whereby the V-belts 96 may cooperate with the main belt to feed the bags through the tape applying and sewing mechanisms.

The V-belts 91 and side belts 70 are driven from a cross shaft 97 by upright shafts 98, geared to the cross shaft 97 by suitable mitre gears 99, as shown in Figure 11. The upright shafts 98 adjustably support the pulleys 92, whereby they may be vertically adjusted with respect to the bag tops. The cross shaft 97 is driven from the drive shaft 41 by a suitable speed reducer 101. The side belts 70, it will be noted by reference to Figures 3 and 4, are shown driven by short chains 102 mounted on sprockets secured to the shafts 98 and the shafts 89' of the end rollers 75 of the side belts 70. Because of the rollers 75 of the side belts 70 being disposed at an incline, as shown in Figures 7 and 11, the short drive chains 102 may have a slight twist therein which, however, is not sufficient to intefere with the proper operation of the chains. If desired, the shafts 89' of side belts 70 may be driven directly from the drive shaft 41.

The rods 87 are disposed slightly above the V-belts 96 and are supported by suitable brackets 104 and 105 secured to a pair of upper frame members 106, shown in Figures 2 and 4. The frame members 106 are shown adjustably supported on upright rods or posts 107, secured to the side frame members 2 and 3, as clearly shown in Figure 2.

Tape applying and sewing mechanisms— Station D

The means for applying a strip of tape 108 to the upper edge of each flattened bag top and securing it thereto, is best shown in Figures 2, 4, and 17 to 21, inclusive, and comprises a roll of tape 109, shown supported directly upon the sewing head, generally designated by the numeral 110, by a suitable support 111 having its lower end suitably secured to the sewing head, as indicated in Figure 2. A tension device 112 prevents overrunning of the tape roll 109 on the support 111. The sewing head 110 is of conventional design and construction and forms no part of the present invention. It is therefore thought unnecessary to herein describe the same in detail.

The sewing head is shown suitably supported on the outer end of a bracket 50 mounted for vertical adjustment upon upright posts 60 having their lower ends suitably secured to the machine frame. The bracket 50, it will be noted by reference to Figure 5, overhangs the conveyer 6 whereby the sewing head will be positioned directly over the path of travel of the bags. The bracket 50 carrying the sewing head 110 may be vertically adjusted upon the posts 60 by rotation of an upright shaft 80 having its upper end portion threaded, as indicated in Figure 5, and received in threaded engagement with the bracket 50. The lower end of the adjusting shaft 80 is rotatably supported in a suitable bearing, not shown. The shaft 80 is operatively connected to a hand wheel 90 by a worm gear drive, indicated by the numeral 100 in Figure 5, wheeby the shaft 80 may readily be rotated to vertically adjust the sewing head 110 with respect to the bag tops.

Figure 17:
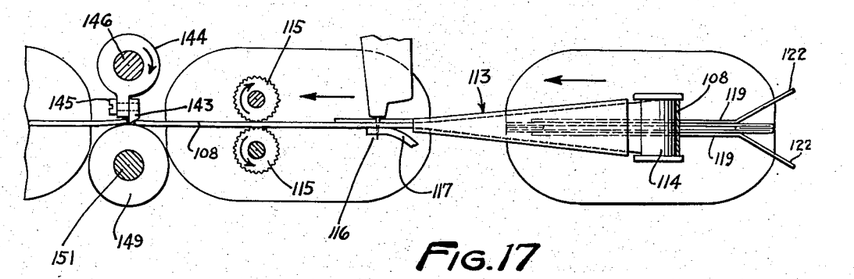
Figure 17 is a diagrammatic plan view showing the position of the bags as they travel beneath the tape applying and sewing mechanisms.
Figures 18, 19, 20, 21, 23:
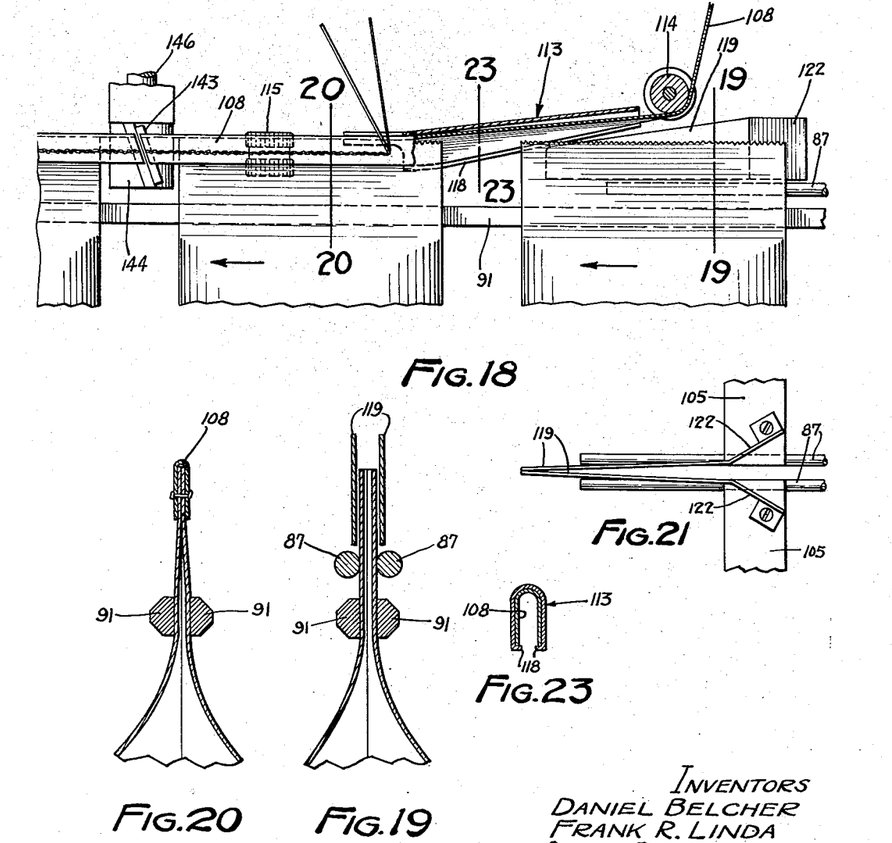
Figure 18 is a side view of Figure 17.
Figure 19 is a detail sectional view on the line 19—19 of Figure 18, showing the bag top positioned between the guide rods and the V-belts just prior to receiving the tape.
Figure 20 is a detail sectional view on the line 20—20 of Figure 18, showing the bag top after the tape has been applied thereto.
Figure 21 is a fragmentary view showing the resilient elements for firmly pressing the flattened bag top walls together and guiding them into the tape applying means.
Figure 23 is a detail sectional view on the line 23—23 of Figure 18, showing the means provided in the tape folder for accurately controlling the folding of the tape.

A tape folder or guide, generally indicated by the numeral 113 is shown suitably secured to the sewing head and is positioned over the path of travel of the bags, as shown in Figures 17 and 18, whereby the flattened bag tops pass therethrough, as clearly shown in Figure 18. The strip of tape is drawn from the supply roll 109 and passes around a flanged idler roller 114, suitably supported at the receiving end of the tape folder 113. The roller 114 guides the strip of tape into the folder 113, whereby the latter folds the tape over the top edge of the bag top passing through the fo'der. The usual puller rolls 115 of the sewing head then engage the tape and press it firmly into engagement with the bag top walls and, at the same time, the needle 116 of the sewing head and the usual presser foot 117, partially shown in Figure 17, cooperate to stitch or sew the tape to the bag top, as will readily be understood by reference to Figures 17 and 18. The puller rolls 115, as is well known, operate in timed relation to the needle 116 and the usual feed dog of the sewing head, not shown.

Another feature of the invention resides in the novel construction of the tape folder 113, whereby the strip of tape is accurately folded upon itself, into U-shaped cross-section, with the assurance that both legs or sides of the folded strip of tape will be of uniform length. To thus accurately fold the tape upon itself, the lower edges of the side walls of the tape folder or guide 113 are provided with inwardly turned ledges 118, as best shown in Figure 23. The opposite edges of the folded strip of tape engage these ledges, as the tape travels through the folder, whereby the legs or side walls of the folded strip of tape will be of uniform size.

Another feature of the invention resides in the means provided for accurately guiding the compressed bag top into the folded strip of tape passing through the tape folder 113. The means provided for thus guiding the bag top into the partially folded strip of tape, comprises a pair of resilient elements 119 which may be suitably secured to the brackets 105 supporting the tail ends of the rods 87. The receiving ends of the resilient elements 119 are outwardly flared as shown at 122 in Figure 21, and the elements 119 are spaced apart at their receiving ends whereby the flattened bag tops may readily enter therein from the guide rods 87. The opposite free ends of the elements 119 are normally positioned as shown in Figure 21, when no bag top is passing therebetween. Thus, when a bag top passes between the elements 119, the resilient free ends thereof will exert a pressure against the walls of the bag top, whereby the compressed bag top may readily enter into the folded strip of tape passing through the tape folder 113, as shown in Figures 17 and 18. The receiving or outwardly flared ends 122 of the resilient guide elements 119 are mounted in fixed relation with respect to the guide rods 87, but the opposite ends thereof are free to flex to permit the bag top to pass therebetween.

The sewing head 110 is shown provided with a pulley 123 driven by a belt 124 from a pulley 125 mounted on an upright shaft 126. The upper portion of the shaft 126 is rotatably supported in a bearing 127 provided in the bracket 50. The pulley 125 is splined to the shaft 126, whereby it may be vertically adjusted on the shaft 126, together with the bracket 50, when vertically adjusting the sewing head with respect to the bag tops.

The lower end of the shaft 126 is shown supported in a bearing 128 and is provided with a clutch, generally indicated by the numeral 129. The clutch 129 serves to operatively connect the shaft 126 to a short upright shaft 131, supported in a suitable gear box 132 which may be supported on the machine frame in any suitable manner. The shaft 131 is operatively connected to a horizontal shaft 133 by suitable gears, not shown, provided in the gear box 132. The shaft 133 is shown driven from a gear reducer 134 which in turn, is driven from the drive shaft 41, as shown in Figure 4. The operation of the clutch 129 is controlled by the traveling movement of the bags through the machine.

Figure 8:
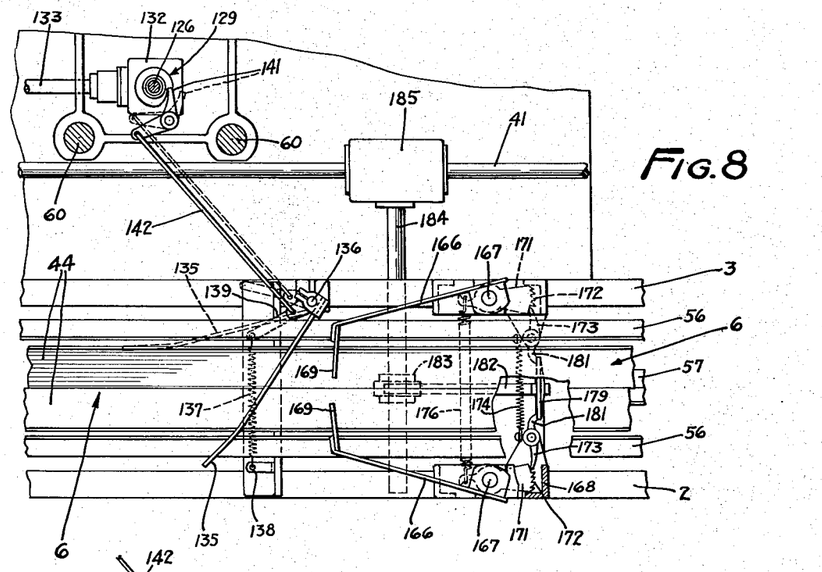
Figure 8 is a fragmentary plan view of a portion of the conveyer, showing the means for controlling the delivery of the bags to the sewing head.

As shown in Figure 8, a control element or finger 135 is secured to an upright shaft 136 and is normally positioned across the path of the bags by a suitable spring 137, having one end anchored as shown at 138. The opposite end of the spring is connected to one end of an arm 139, the opposite end of which is secured to the upright shaft 136. The shaft 136 is mounted in suitable bearings, not shown. The control element or finger 135 is operatively connected to a dog 141 by a suitable connection 142, whereby the dog 141 may be moved into or out of operative engagement with the clutch 129 by swinging movement of the control element or finger 135, as will be understood by reference to Figure 8.

When the dog 141 is in the position shown in Figure 8, the clutch 129 is rendered inoperative to drive the shaft 126, whereby the operation of the sewing head is interrupted. When a bag engages the control element 135 and swings it to the dotted line position shown in Figure 8 and full line position shown in Figure 9, the dog 141 is moved out of engagement with the clutch, as indicated by the dotted lines in Figure 8, whereupon the clutch is made operative to drive the shaft 126. The sewing head is then operated to stitch the tape to the bag top, as shown in Figures 17 and 18. It will thus be noted that the operation of the sewing head is controlled entirely by the traveling movement of the bags through the machine.

Tape cutter

The means for cutting or severing the tape between bags, as shown in Figures 17 and 18, comprises a cutting element or knife 143 shown mounted on a suitable supporting collar 144 by screws 145. The cutting element is angularly disposed to the axis of the collar 144, as shown in Figure 18, whereby a shearing effect is obtained, when cutting the tape. The collar 144 is supported on an upright shaft 146 mounted in a suitable bearing 147 provided on a housing 148, as shown in Figure 5. The housing 148 may be secured to the supporting bracket 50 by suitable means, not shown in the drawings. The housing 148 is therefore movable vertically with the bracket 50, when the sewing head is vertically adjusted with respect to the bag tops. The cutting edge of the cutting element or knife 143 is adapted to substantially engage the periphery of a roller 149, rotatably supported on a stud 151 depending from a portion of the housing 148, as shown in Figure 5.

The shaft 146 of the tape cutter 143 is driven from one end of a horizontal shaft 152 by a suitable worm gear 153, indicated in dotted lines in Figure 5. The shaft 152, in turn, is driven from a short upright shaft 154 by bevel gears 155. A suitable clutch, generally designated by the numeral 155, is adapted to operatively connect the shaft 154 to the upper end of a shaft 156, the lower end of which has a pair of bevel gears 157 operatively connecting it to a speed reducer 158 which, in turn, is driven from the main drive shaft 41, shown in Figure 4. The upright shaft 156 is adapted for continuous operation with the drive shaft 41, but the operation of the horizontal shaft 152 is controlled by the clutch 155. The operation of the clutch is controlled by the movement of the bags through the machine.

Figure 24:
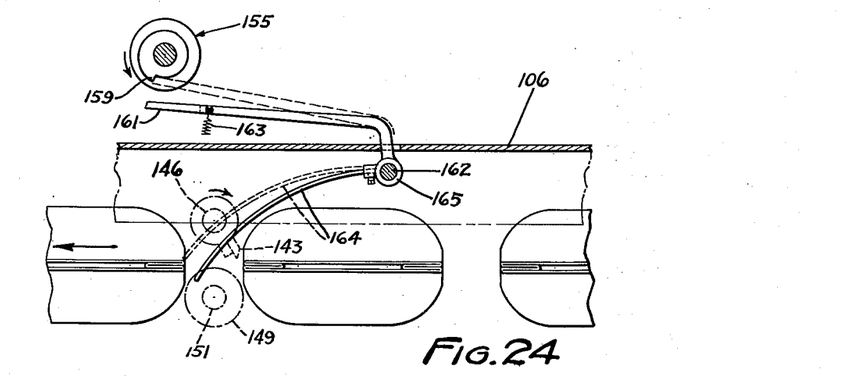
Figure 24 is a fragmentary detail view showing in full and dotted lines the two positions of the control means for the tape cutter.
Figure 25:
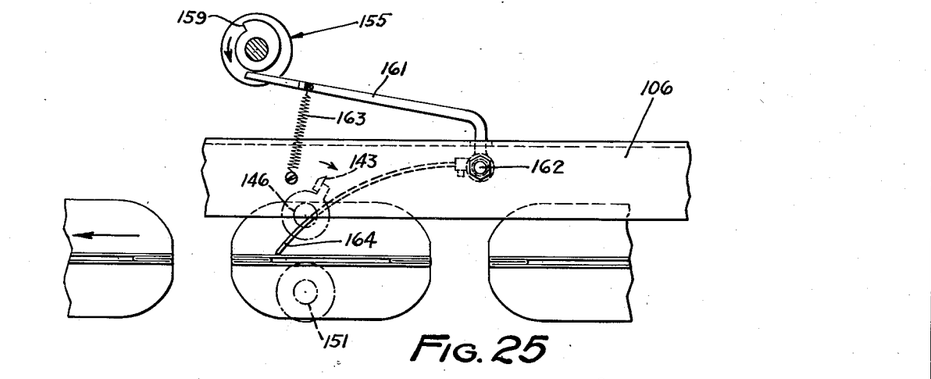
Figure 25 is a similar view showing the clutch control of the tape cutter control element in position to render the clutch inoperative.

As best shown in Figures 24 and 25, the clutch 155 is provided with a shoulder 159 adapted to be engaged by one end of a clutch operating arm or member 161, pivotally mounted on a stud 162 and having a spring 163 normally tending to hold it out of engagement with the clutch 155, as shown in full lines in Figure 24. A control finger or element 164 is secured to the hub 165 of the operating member 161, whereby it is adapted for oscillation simultaneously with the member 161. The control element 164 is normally positioned as shown in full lines in Figure 24, wherein it will be noted that it is positioned in the path of the bag tops, whereby it will be engaged by each bag top, as shown in Figure 25, as the bags advance through the machine.

When the control element 164 is moved from the full to the dotted line position shown in Figure 24, the clutch operating arm 161 is moved to the full line position shown in Figure 25, whereby the shoulder 159 of the clutch 155 will engage the end of the member 161 and render the clutch inoperative to drive the tape cutter. The moment the control element 164 disengages the bag top and returns to the full line position shown in Figure 24, the control member 161 releases the clutch 155, whereupon the clutch is rendered operative to rotate the tape cutter one revolution, whereby it will sever the tape between adjacent bags, as clearly illustrated in Figure 17. The tape cutter is so timed with relation to the travel of the bags and the operation of the sewing head, that it will engage and sever the tape between adjacent bags, as shown in Figure 17, without interrupting the movement of the bags through the machine.

*Means for controlling delivery of bags to sewing head*

Figures 9, 10:
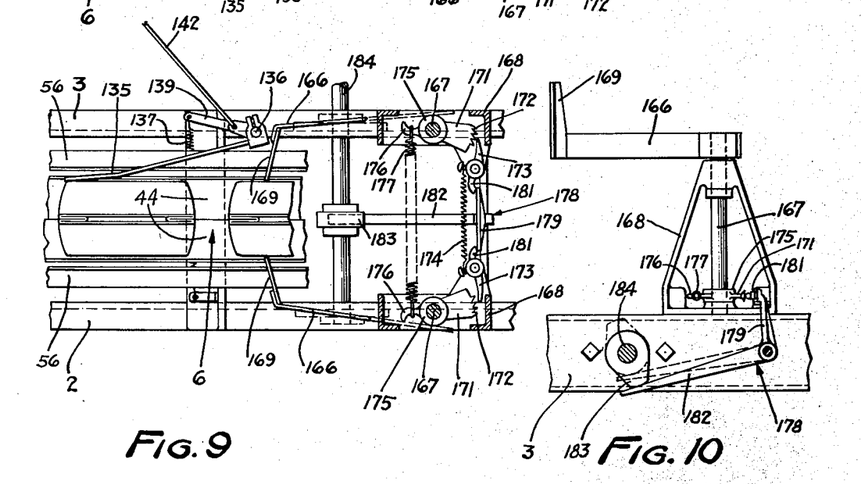
Figure 9 is a similar view showing the parts, after having been actuated to release a bag.
Figure 10 is a detail sectional view showing the means for operating the gates for controlling the delivery of the bags to the sewing head.

Means is provided for controlling the delivery of the bags to the sewing head, whereby they will be delivered thereto in accurately spaced relation, as shown in Figures 8, 9, and 10. As here shown, a pair of oppositely disposed arms 166 are secured to the upper ends of shafts 167 mounted in suitable brackets 168 secured to the side frame members 2 and 3 of the machine frame. The arms 166 are provided at their outer ends with upright plates 169 which may be termed "gates." These gates are adapted to be swung inwardly into the path of the bags to be engaged thereby, as shown in full lines in Figure 8.

A ratchet member 171 is secured to the lower end of each shaft 167. These ratchets are provided with spaced teeth 172 adapted to be engaged by a pair of spring actuated dogs 173, having a spring 174 normally urging them into engagement with their respective ratchet members 171. The ratchet members 171 are shown provided with suitable hubs 175 for securing them to the shafts 167. Each hub 175 may be provided with a hook 176 to which the ends of a suitable tension spring 177 are connected. The spring 177 thus constantly exerts a force on the gates 169 to normally retain them in the position shown in Figure 8. When the gates are thus positioned, they are prevented from outward movement by the ratchets 171 and dogs 173, as will readily be understood by reference to Figure 8, whereby each bag engaging the gates may temporarily come to rest on the conveyor 6, until the gates are released.

Means is provided for intermittently releasing the gates 169, whereby the pressure of a bag thereagainst, caused by the action of the conveyor 6, may swing the gates outwardly to the position shown in Figure 9, whereby the bag interrupted thereby, may pass on to the sewing head in accurately spaced relation to the preceding bag, as illustrated in Fig. 9. The means provided for thus intermittently releasing the gates 169 is shown comprising a bell crank, generally designated by the numeral 178. This bell crank is shown having an upright arm 179 adapted to engage inwardly extending portions 181 of the dogs 173, as shown in Figures 8 and 9. The long arm 182 of the bell crank 178 is adapted to be actuated by a cam 183 secured to a cross shaft 184 driven from the drive shaft 41 by a suitable speed reducer 185, indicated in Figure 8.

It will thus be noted that for each revolution of the cam 183, the bell crank 178 will be operated to release the dogs 173 from the ratchet members 171, as shown in Figure 9, whereby the pressure of the bag against the gates 169 will cause the gates to swing outwardly and permit the bag to pass on. The action of the spring 174 on the dogs 173 will cause the inwardly extending portions or fingers 181 of the dogs to constantly exert a pressure against the upper end of the arm 179 of the bell crank 178, whereby the lower end of the arm 182 of the bell crank may be constantly held in contact with the periphery of the cam 183.

*Operation*

In the operation of the machine as herein disclosed, an operator slips an empty bag over the skirt 13 of the bag holder, each time the skirt reaches its forward position, shown in full lines in Figure 13. When the bag holder, including the skirt 13, is in the position shown in full lines in Figure 13, the grippers 16 are positioned as shown in Figure 14. The end walls of the bag may then be readily passed upwardly between the gripping surfaces 19 of the grippers and the V-shaped end walls of the skirt, as shown in Figure 12, whereby it will be noted that the end walls of the bag top are partially intucked between the side walls thereof. When the bag receives a charge and the filled bag is moved to the position shown in dotted lines in Figure 13 and full lines in Figure 15, and is deposited onto the conveyer 6, the side belts 73 of the conveyer will engage the side walls of the bag top and gradually press them inwardly, as shown in Figure 3, with the end walls of the bag top intucked therebetween. The filled bag is released from the bag holder when the roller 33 of the yoke 27 engages the cam 32, whereby the yoke will swing the grippers from the position shown in Figure 14 to that shown in Figure 15, thereby causing the gripping surfaces 19 thereof to release the bag, as will be readily understood by reference to Figure 15.

The filled bag then advances towards station B, where it is subjected to a vibratory or shaking action to settle the contents thereof. Simultaneously, as the bags advance through station B, the bag top walls are gradually being compressed into flatwise relation, and at the same time, the upper portions of the bag bodies are shaped, as shown in Figures 7 and 11.

From station B, the bags advance to station C, where the partially flattened bag tops engage the disks 89 which further compress the walls thereof and guide the bag tops between the guide rods 87, whereby the bag tops are further flattened by the combined actions of the rods 87 and V-belts 97. During the passage of the bags through station C to station D, the V-belts 91 cooperate with the main conveyer 6 to feed the bags toward station D, whereby the bag bodies are maintained in true upright position, as they are successively delivered to station D.

As each bag approaches station D, it engages the gates 169, whereby its movement is temporarily interrupted, until the gates are swung outwardly as a result of the cam 183, shown in Figures 9 and 10. The bag top then passes through the resilient guide plates 119 which further compress the bag top walls so that the compressed bag top may readily enter the partially folded strip of tape passing through the tape folder 113, as shown in Figure 18. The strip of tape is constantly being drawn from the supply roll 109, as a result of the tape being continually stitched to the traveling bag tops, as shown in Figures 17 and 18.

During the sewing of the strip of tape to the bag top, the puller rolls 115 of the sewing head, which operate in timed relation to the travel of the main conveyer 6, feed the bag top through the sewing head in timed relation to the operation of the sewing needle 116 and the action of the usual feed dog of the sewing head, not shown.

The function of the gates 169 is to accurately space the bag apart as shown in Figure 18, when they approach the sewing head, whereby a strip of tape may be uniformly applied to the top of each bag.

The operation of the sewing head is controlled by operation of the control finger 135 by each bag as it passes through station D. The control finger 135 is preferably so arranged with respect to the travel of the bags through station D that as long as the bags are delivered thereto in accurately spaced relation, as shown in Figures 17 and 18, the operation of the sewing head may be continuous. When, however, the delivery of bags to station D is interrupted, as when the operator at station A ceases to deliver bags thereto, the control finger 135 will return to the full line position shown in Figure 8, whereby the clutch 129 is rendered inoperative to drive the sewing head.

The final operation in completing the closing and sealing of the bag top resides in severing the strip of tape, as shown in Figures 17 and 18. The tape cutter, as shown in these two figures, is controlled entirely by the traveling movement of the bags through the machine in a manner similar to the sewing head. To thus control the tape cutter, the finger 164 is positioned in the path of the bags, as shown in Figures 24 and 25, which controls the operation of the clutch 155, which drives the rotary knife 143 of the tape cutter. The control finger 164 of the clutch 155 is so arranged that it engages the upper flattened bag top, whereby its oscillatory movement is relatively small, compared to the movement of the control finger 135 of the sewing head, as shown by the full and dotted lines in Figure 24. Because of the control finger 164 engaging only the flattened tops of the bags, each time it disengages a bag top, as shown in full lines in Figure 24, it moves the clutch arm 161 out of engagement with the shoulder 159 of the clutch 155, whereby the clutch 155 is rendered operative to drive the tape cutter. As soon as a bag top engages the finger 164 and swings it outwardly to the dotted line position shown in Figure 24, and the position shown in Figure 25, the clutch control arm 161 swings into the path of the shoulder 159 of the clutch, whereby the clutch is subsequently actuated to interrupt operation of the tape cutter.

By thus controlling the operation of the tape cutter, the severing of the tape between adjacent bags is accurately accomplished so that all closed bag tops will be substantially uniform in appearance.

From the foregoing, it will be noted that the operation of compressing the bag top walls into flatwise relation and applying and securing a strip of tape to the upper edge of each bag top, as shown in Figure 20, is substantially automatic and requires little care upon the part of the attendant, except to load the bag holder with an empty bag each time it moves forwardly to bag receiving position, as shown in full lines in Figure 13.

In the accompanying drawings, we have shown the various mechanisms of the machine as being driven from the main drive shaft 41 by independent speed reducers. It is obvious that various changes may be made in the driving means of the various mechanisms of the machine without departing from the scope of the invention.

We claim as our invention:

1. In a machine of the class described, a trough-shaped conveyer for conveying filled bags, endless side belts having their inner runs adapted to engage opposite sides of the bag bodies and having upper portions thereof inclined inwardly towards each other transversely to the direction of travel of the belts, said belts also being arranged to engage the bag bodies with increasing pressure in the direction of travel, thereby to shape the bag bodies.

2. In a machine of the class described, a trough-shaped conveyer for conveying filled bags, endless side belts having their inner runs adapted to engage opposite sides of the bag bodies, said inner runs gradually tapering inwardly from the receiving end of the conveyer in the direction of travel and also having upper portions inclined inwardly towards each other transversely to the direction of travel of the belts, whereby filled bags conveyed through the machine by said conveyer will be subjected to gradually increasing pressure, and means for simultaneously driving the conveyer and side belts at the same speed to advance the bags through the machine in upright position.

3. In a machine of the class described, a main conveyer for advancing filled flexible containers through the machine, said conveyor being substantially trough-shaped in cross-section to prevent the filled containers from relatively rotating thereon, endless side belts having their inner runs adapted to engage opposite sides of the container bodies, said inner runs being relatively closer together at the discharge end of the conveyer than at the receiving end of the conveyer and having upper portions thereof inclined inwardly toward each other transversely to the direction of travel of the belts, whereby the upper portions of the container bodies will be subjected to gradually increasing pressure by the inner runs of said side belts, thereby to partially flatten and shape the upper portions of container bodies.

4. In a machine of the class described, a conveyer for the bags comprising a pair of longitudinally extending endless belts having their adjacent runs angularly disposed and cooperating to provide a conveyer of trough-shape cross-section, means at one end of the machine for delivering filled bags to said conveyer, and a pair of endless side belts having their inner runs adapted to engage opposite sides of the bag bodies, said side belt runs being vertically disposed at the receiving end of the conveyer and gradually inclining inwardly towards each other transversely to the direction of travel of the side belts, thereby to increase the pressure on the upper portions of the bag bodies to shape the latter and facilitate closing the bag tops.

5. In a machine of the class described, a conveyer for the bags comprising a pair of longitudinally extending flat belts having their adjacent runs angularly disposed and cooperating to provide a conveyer of trough-shape cross-section, means at one end of the conveyer for delivering filled bags thereto, a pair of endless side belts having their inner runs adapted to engage opposite sides of the bag bodies, said side belt runs being vertically disposed at the receiving end of the conveyer and having other portions thereof inclined inwardly towards each other transversely to the direction of travel of the belts, and said side belt runs also tapering inwardly in the direction of bag travel, whereby the upper portions of the bag bodies are gradually flattened, as the bags advance through the machine.

6. In a machine of the class described, a conveyer for the bags comprising a pair of longitudinally extending flat belts having their adjacent runs angularly disposed and cooperating to provide a conveyer of trough-shape cross-section, means at one end of the conveyer for delivering filled bags thereto, a pair of endless side belts having their inner runs adapted to engage opposite sides of the bag bodies to shape them, the inner runs of said side belts gradually inclining inwardly toward each other transversely to the direction of travel of the side belts from the receiving end of the conveyer, thereby to press the upper portions of opposed walls of the bag top into closer relation.

7. In a machine of the class described, a V-shaped conveyer for conveying filled bags, endless side belts having their inner runs adapted to engage opposite sides of the bag bodies, said inner runs gradually tapering inwardly from the receiving end of the conveyer in the direction of travel and also having upper portions inclined inwardly towards each other transversely to the direction of travel of the belts, whereby filled bags conveyed through the machine by said conveyer will be subjected to gradually increasing pressure, means for simultaneously driving the conveyer and side belts at the same speed to advance the bags through the machine in upright position, and means along the conveyer for equally spacing the bags on the conveyer.

8. In a machine of the class described, a trough-shaped conveyer for conveying filled bags, endless side belts having their inner runs adapted to engage opposite sides of the bag bodies and having said inner runs gradually tapering inwardly toward the discharge end of the conveyer, the upper portions of said side belts being also inclined inwardly towards each other transversely to the direction of travel of the belts to flatten the upper portions of the bag bodies as they advance through the machine, and means for simultaneously vibrating the filled bag bodies to more firmly settle the contents into the lower portions of the bag bodies and thereby facilitate the shaping of the upper portions of the bag bodies and the subsequent closing of the bag tops.

9. In a machine of the class described, a trough-shaped conveyer comprising a pair of substantially right angularly disposed flat belts for supporting and conveying the filled bags through the machine, endless side belts having their inner runs adapted to engage opposite sides of the bag bodies, said inner runs gradually tapering inwardly from the receiving end of the conveyer in the direction of travel and also having upper portions inclined inwardly toward each other transversely to the direction of travel of the belts, whereby filled bags conveyed through the machine by said conveyer will be subjected to gradually increasing pressure to partially flatten the upper portions of the bag bodies and shape them.

DANIEL BELCHER.
FRANK R. LINDA.

CERTIFICATE OF CORRECTION.

Patent No. 2,362,462. November 14, 1944.

DANIEL BELCHER, ET AL.

It is hereby certified that error appears in the printed specification of the above numbered patent requiring correction as follows: Page 2, second column, line 58, for "Figure 2" read --Figure 12--; page 5, first column, line 7, for "wheeby" read --whereby--; page 6, first column, line 43, for "in operative" read --inoperative--; page 7, first column, line 49, for "bag" read --bags--; and that the said Letters Patent should be read with this correction therein that the same may conform to the record of the case in the Patent Office.

Signed and sealed this 27th day of March, A. D. 1945.

Leslie Frazer (Seal)                    Acting Commissioner of Patents.